Aug. 15, 1933.　　　　　P. H. CHASE　　　　1,922,907
CABLE
Filed July 25, 1928　　　2 Sheets-Sheet 1
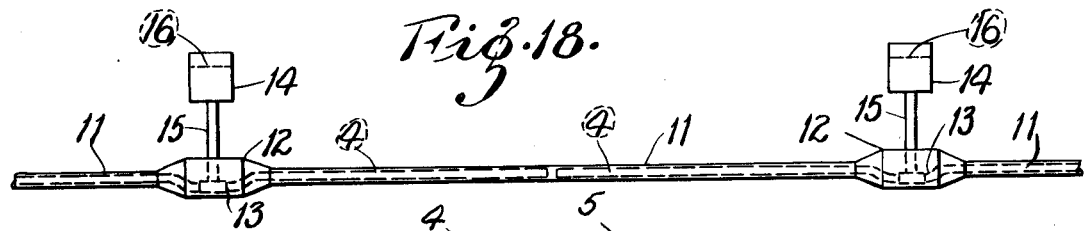
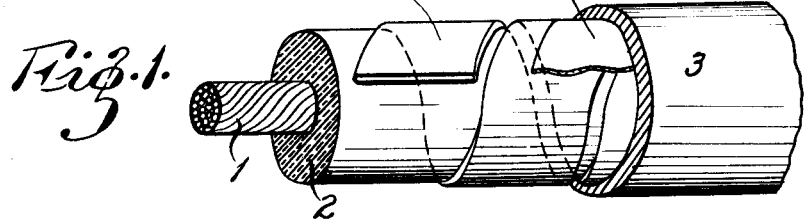
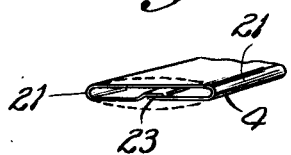
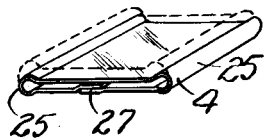
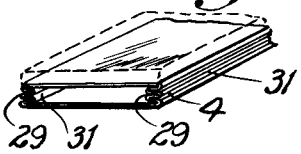
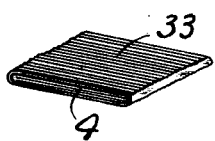
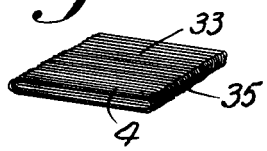
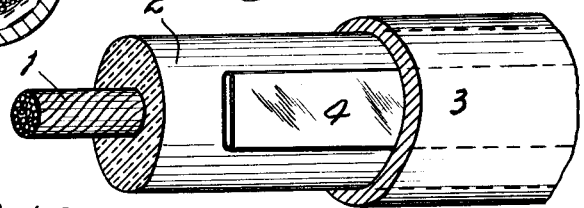
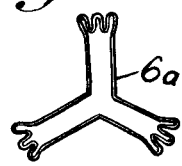
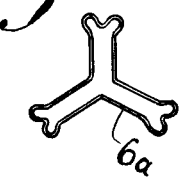
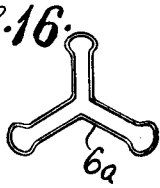
Philip H. Chase,
Inventor,
Delos G. Haynes
Attorney Aug. 15, 1933. P. H. CHASE 1,922,907
CABLE
Filed July 25, 1928 2 Sheets-Sheet 2
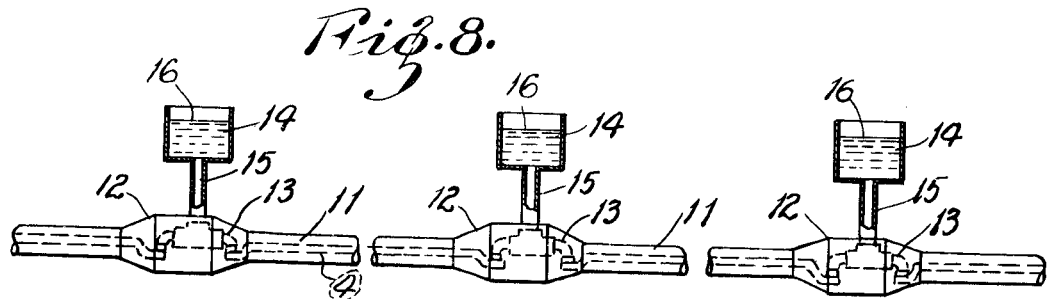
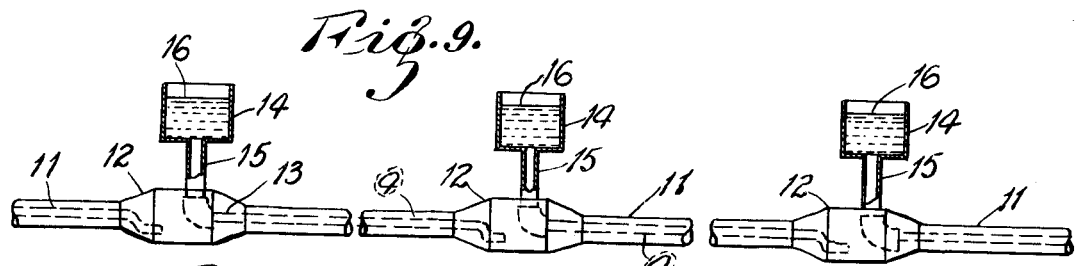
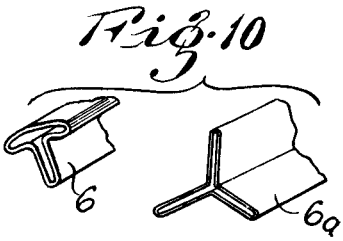
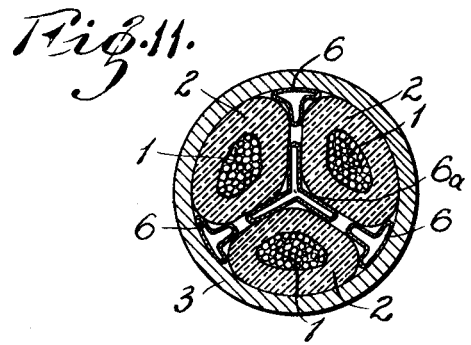
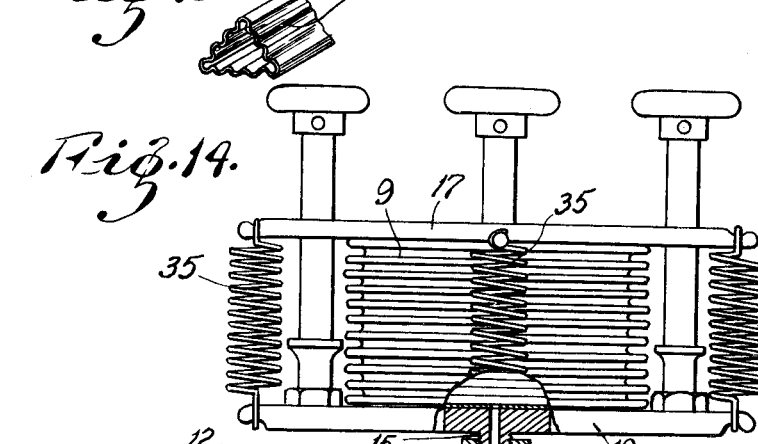

Patented Aug. 15, 1933

1,922,907

UNITED STATES PATENT OFFICE 1,922,907

CABLE

Philip H. Chase, Bala-Cynwyd, Pa.

Application July 25, 1928. Serial No. 295,223

4 Claims. (Cl. 173—266)

This invention relates to cables, and with regard to certain more specific features to impregnated electric cables preferably for high voltages.

Among the several objects of the invention may be noted the provision of a simple and improved method of constructing a cable to relieve or equalize hydrostatic pressure within the sheath by the use of a liquid; the provision of an improved liquid expansion device within the cable for controlling the internal pressure due to temperature changes; the provision of a cable construction of the class described which minimizes the formation of voids therein; and the provision within a cable of the class described of a liquid enclosing device for compensating the pressures caused by the relative expansion and contraction of the parts of the cable. Other objects will be in part obvious and in part pointed out hereinafter.

The invention accordingly comprises the elements and combinations of elements, features of construction and operation, arrangements of parts, steps and sequence of steps which are exemplified in the structure hereinafter described and the scope or application of which will be indicated in the following claims.

In the acompanying drawings in which are illustrated several embodiments of the invention, Fig. 1 is a trimetric view of a section of cable, certain portions being broken away to show a helical form of the invention;

Figs. 2, 3 and 4 are trimetric views showing sections of various forms of flexible containers;

Figs. 5 and 6 are trimetric views showing sections of flexible containers having laterally corrugated surfaces;

Fig. 7 is a trimetric view of a section of cable showing a modified non-helical form of the invention, parts being broken away;

Fig. 8 schematically illustrates a system in which connected elements of the present invention are used with reservoirs;

Fig. 9 is a view similar to Fig. 8 but in which the elements of the invention are disconnected, the elements being shown with separate reservoirs;

Fig. 10 is a trimetric view, partly in section showing a modified form of the invention;

Fig. 11 is a cross section of a cable showing the application of the parts shown in Fig. 10;

Fig. 12 is a cross section of a cable showing another form of the invention;

Fig. 13 is a trimetric view partly in section showing one of the members used in the Fig. 12 construction;

Fig. 14 is a side elevation of a preferred form of reservoir, certain portions being broken away;

Figs. 15, 16 and 17 are cross sections showing modified forms of the Fig. 10 general shapes;

Fig. 18 is a modification analogous to Figs. 8 and 9, illustrating a system in which the connecting elements, with their respective reservoirs, are split and closed at a point between the reservoirs; and, Fig. 19 is a cross section showing an alternative tape position.

Similar reference characters indicate corresponding parts throughout the several views of the drawings.

Referring now more particularly to Fig. 1, the ordinary cable conductor is designated by numeral 1 and the insulation by numeral 2. Applied helically over the insulation is a relatively small, separate or unattached, hollow tape or container or conduit 4, peripherally closed, which is so constructed of thin, flexible metal, for example copper or a like completely impermeable material, that the cross-sectional area, and therefore the volume, is capable of sufficient change as a consequence of lateral movement of the walls. Over this hollow tape 4 is applied a retaining or protecting tape 5, which may be made of paper or metal or of other suitable material. This protecting tape 5 is laid on helically in the same or reverse helical direction with regard to the hollow tape 4. The usual outer lead sheath 3 is then applied.

Figs. 2, 3 and 4 show in trimetric projection sections of several modifications of the hollow tape or flattened tube 4, in which are shown said tape constructed of one or two strips of thin metal tightly joined together at the edges, for example, by welding or soldering, or by a combination of these methods, to afford a fluid-tight union. The solid lines show the unexpanded or compressed positions of the walls and the dotted lines show the positions of the walls when expanded due to a difference in internal and external pressures.

Fig. 2 shows the hollow tape with rounded edges 21 with a welded or soldered joint 23. Fig. 3 shows the tape with bulbous edges 25 with a welded or soldered joint 27. Fig. 4 shows a bellows type of tape having edges 29 formed with reentrant curvatures adapted to form folds and creases 31, thereby providing increased flexibility. The hollow tapes also may be formed from seamless tubing, by flattening and/or drawing to the desired shape and size.

In order to permit the hollow tape to warp more readily when it is applied to the cable during manufacture, to provide greater flexibility during bending of the cable and to minimize initial strains, particularly in those portions of the walls of the tape which are subject to flexure during operation, one or more of the walls of the hollow tape may be slightly corrugated laterally of the length, for example, as shown at 33 in Figs. 5 and 6.

Fig. 5 shows a form in which the lateral corrugations 33 are formed only on the flat faces of the tape, whereas in Fig. 6 is shown a form in which the corrugations on the faces are carried around the edges of the tape, as illustrated at numeral 35, so that said corrugations are substantially continuous around the tape.

In Fig. 7 is shown a cable with the hollow tape 4 laid axially of the cable and without retaining or protecting tape thereover.

The hollow tape 4 in this embodiment as well as those shown in Figs. 1, 2, 3, 4, 5 and 6 comprises a continuous, separate, expansible passageway or conduit lengthways of the cable, which contains and/or transmits fluids of liquid form, which may, if desired, be of a nature which would ordinarily adversely affect the insulation of the cable if in contact therewith or interspersed therein. Preferably by the use of a liquid such as thin oil for example, for filling the hollow tape, the internal hydrostatic pressure along the cable is substantially equalized and made more susceptible of control, as will be shown. Further, as will be shown, this control of hydrostatic pressure is quickly responsive to changed conditions and is largely independent of the degree of viscosity or fluidity of the cable impregnating compound, and also is largely independent of the degree of longitudinal permeability of the insulation to the impregnating compound because the oil or other liquid in the tape, being more mobile, if desired, than the impregnating compound and being in a separate passage may more readily pass to the expansion chambers used and to be described. The fact that this liquid may be separated from the compound permits of a wide choice of mobile substances. The hollow tape may be used in cable which has compound-filled passages in or adjacent to the insulation or conductor.

Variations of hydrostatic pressure within a cable are largely determined by the relative temperatures and coefficients of expansion of the conductor, insulation, compound and outer sheath. As the conductor, solid insulation and impregnating compound or oil are substantially incompressible, the resultant pressure from their expansion ordinarily is exerted on the outer sheath. In case this is of lead, permanent stretching of the sheath may be caused. Conversely, when the cable cools, the internal hydrostatic pressure will be lower than under corresponding conditions before the sheath had stretched. Low pressures may result in the rapid deterioration and ultimate failure of the insulation due to the formation of voids and ionization therein under electric stress. The utilization of my hollow tape affords a means and method for controlling or regulating the hydrostatic pressure within predetermined limits and thereby contributes to minimize the stretching of the outer sheath, the formation of voids and the destruction of insulation.

The hollow tape may be continuous throughout one or more sections of cable. Connections between the hollow tapes in adjacent cable lengths are made preferably in the cable splices by small connecting pipes or tubes 13, or the hollow tubes may merely open into the splices in case the impregnating compound and the liquid in the hollow tape may be permitted to mix or be in contact.

The change in cross sectional area of the tape or tube due to hydrostatic pressure compensation is greater than the change of area between the solids in the cable. This accounts for much of the superiority of the invention and is obtained by making the tape or tube freely expansible and independent of the cable parts surrounding the same.

A system of hollow tapes, connections and open reservoirs is illustrated schematically in Fig. 8. The cable sections 11 are connected by splices 12, and the hollow tapes are connected within said splice by connecting pipes or tubes 13. To these pipes are connected reservoirs 14 by pipes 15. The elevation of the surface of the liquid 16 in the reservoirs above the cable determines the hydrostatic pressure within the hollow tapes.

As the temperature of the different parts of the cable changes and there is a difference in the rate of expansion of those parts, the pressure upon the walls of the hollow tape changes and if there is an excess external pressure, such as, for example, when the cable is heating, the hollow tape 4 decreases in cross section and the liquid therein is forced toward the splices and therefrom to the reservoirs. The pressure exerted upon the outer sheath is thus limited.

Conversely, in case there is a decrease of pressure external to the hollow tape, such, for example, as when the cable is cooling, the hollow tape increases in cross section, the flow of liquid is from the reservoirs into the hollow tube, it enlarges its area throughout the length of cable and compensates for the shrinkage of the compound and other parts.

It is thus apparent that the pressure within the cable is maintained within predetermined limits and stretching of the outer sheath and the formation of voids are minimized. The above is true both when the various sections of tape are connected and when they are installed separately. The liquid under the above conditions flows to and from the reservoirs but the flow response is immediate and proceeds rapidly, because a liquid of the desired mobility can be utilized, and because the cross-sectional area of the separate passage provided for it and the distance of liquid travel from the reservoirs can be varied to suit the requirements.

The reservoirs may be of various types other than illustrated, such as for example collapsible metallic bellows, with or without weights or spring devices, and the like, depending upon the pressure limits and operating characteristics desired.

In Fig. 14 is shown a spring-loaded bellows type of closed reservoir connected to a pipe 13, the latter joining adjacent tape lengths. In this construction the bellows 9 is interiorly connected with said pipe 13 and held in compressed position by springs 35 operating on end plates 17, 19 for the bellows.

In Fig. 18 is illustrated an embodiment of the invention, wherein the hollow tube 4 is split at a point between reservoirs, in this instance midway between the reservoirs. At this point of split, each end of the tube is preferably closed, so that the passageways in the two tube sections are separate from the rest of the cable. The reservoirs at each splice feed into these hollow tubes. The maximum distance of feed is thus half the length of a section, in instances where the split occurs midway in a section.

As stated, the hollow tapes in each section length may terminate in and open into the splice or splices at either end and there may be a reservoir connecting to the interior of the splice which serves both for the compound or liquid in the interstices of the splice and cable and for the liquid in the hollow tape. Also the reservoir for the hollow tape may be installed internal to the splice, with or without a reservoir for supplying the splice.

As illustrated in Fig. 9, a separate expansion tank or reservoir 14 may be used with each disconnected section of tape 4, thus also affording means for obtaining different pressures throughout different cable sections.

It is apparent that two or more hollow tapes may be used in case a greater range of volumetric capacity is desired.

The hollow tape may be laid in between the insulated conductors of a multiple-conductor cable, particularly of the shielded type. This is illustrated in Fig. 19 in which 4 is hollow tape or flat tubing of the shape of Fig. 2.

The hollow container can also be made in a generally triangular shape instead of in flat tape form. Fig. 10 illustrates shapes 6 and 6a suitable to lay respectively in the spaces ordinarily occupied by the lateral and central fillers in a 3-conductor sector type cable such as shown in Fig. 11. Either of these shapes may have a portion lie between the point of nearest approach of the insulated conductors, or either or both shapes of tube may be confined to the filler space. In Fig. 11 the shapes 6 and 6a are shown in position and these shapes may be used either singly or together, or shape 6 may be used with the flat tube or tubes of Fig. 19.

As illustrated in Figs. 15, 16 and 17 the edges 31 of the Fig. 10 members may be formed as the edges of the tape shown in Figs. 2, 3 and 4, that is made bulbous or convoluted to various degrees.

Fig. 12 illustrates an expansible, triangular-shaped convoluted conduit 18 carried through the center 20 of the conductor 1 in a cable of the hollow conductor type. Fig. 13 shows the conduit 18 in enlarged view. The conduit is preferably formed with a twist or lay several times its diameter in order to afford greater flexibility during bending of the cable. In this form the liquid is carried inside of the conduit 18, and the pipe connections in the splices from the conduit to the reservoirs are made in part of insulating materials or through insulating joints.

From the above it will be seen that this invention distinguishes from prior cables using merely flexible, constant cross-section, fluid-carrying conduit which served merely as longitudinal channels for the passage of the impregnating oil or compound. Herein, the conduit is also expansible so that its area of cross section changes as pressure changes so as to function as a compensating device.

It is to be understood that certain classes of liquid within the tape are more desirable than others, depending upon particular circumstances.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A cable comprising a conductor, a sheath surrounding said conductor, and a liquid insulating medium therefor expansible with increase of temperature, a separate, impermeable, liquid-carrying, metallic tube in the sheath, said tube being thin enough to be substantially expansible and contractible in area of cross section in response to change in hydrostatic pressure exerted upon said tube by said liquid insulating medium due to change of temperature, and a hydrostatic compensating reservoir connected with the tube whereby liquid flows between the tube and reservoir upon temperature change permitting the change in said area of cross section, the change in cross sectional area of the tube due to said change in hydrostatic pressure being greater than the change of area between the solids in the cable.

2. A cable comprising a conductor, a sheath surrounding said conductor, and a liquid insulating medium therefor expansible with increase of temperature, a completely impermeable liquid-carrying tube in the sheath, said tube being unattached to surrounding bodies and being substantially expansible and contractible in area of cross section in response to change in hydrostatic pressure exerted upon said tube by said liquid insulating medium due to change of temperature, a hydrostatic compensating reservoir means associated with said tube whereby liquid flows between the tube and reservoir upon temperature change permitting said change in area upon expansion and contraction of the parts of the cable, the expansion and contraction of said area of cross section taking place inversely to that of the surrounding parts of the cable, the change in cross section being greater than the change of area between the solids in the cable.

3. A cable comprising a conductor, a sheath surrounding said conductor, and a liquid insulating medium therefor expansible with increase of temperature, a positively impermeable and separate metallic liquid-carrying tube in the sheath, said tube being freely expansible and contractible in area of cross section in response to change in hydrostatic pressure exerted upon said tube by said liquid insulating medium due to change of temperature, and hydrostatic reservoir means associated with said tube whereby liquid flows between the tube and reservoir upon temperature change and effecting said change in area upon expansion and contraction of the parts of the cable, the expansion and contraction of said area of cross section taking place inversely to that of the surrounding parts of the cable, the change in cross sectional area of the tube due to said change in hydrostatic pressure being greater than the change of area between the solids in the cable, said tube comprising a helical conduit located between the surface of the cable core and sheath.

4. A cable comprising a conductor, a sheath surrounding said conductor and a liquid insulating medium therefor expansible with increase of temperature, a positively impermeable and separate liquid-carrying tube in the sheath, said tube being freely expansible and contractible in area of cross section in response to change in hydrostatic pressure exerted upon said tube by said liquid insulating medium due to change of temperature, and hydrostatic reservoir means associated with said tube whereby liquid flows between the tube and reservoir upon temperature change and effecting said change in area upon expansion and contraction of the parts of the cable, the expansion and contraction of said area of cross section taking place inversely to that of the surrounding parts of the cable, the change in cross sectional area of the tube due to said change in hydrostatic pressure being greater than the change of area between the solids in the cable, said tube being unattached to surrounding bodies and comprising a helical conduit located between the surface of the cable core and sheath.

PHILIP H. CHASE.